United States Patent [19]
Brandt et al.

[11] 4,406,265
[45] Sep. 27, 1983

[54] PEAK COMBUSTION PRESSURE CONTROLLED SPARK TIMING CONTROL SYSTEM WITH ENGINE SPEED DEPENDENT FILTER

[75] Inventors: Herman F. Brandt, Birmingham; Wayne A. Daniel, Sterling Heights; Anthony A. Sperling, Grosse Pointe Park, all of Mich.

[73] Assignee: General Motors Corporation, Detroit, Mich.

[21] Appl. No.: 362,402

[22] Filed: Mar. 26, 1982

[51] Int. Cl.³ ............................................. F02P 5/10
[52] U.S. Cl. .................................. 123/425; 123/435; 73/115
[58] Field of Search .................. 123/425, 435; 73/35, 73/115, 116, 117.3

[56] References Cited

U.S. PATENT DOCUMENTS

| | | | |
|---|---|---|---|
| 3,875,907 | 4/1975 | Wessel et al. | 123/440 |
| 3,895,611 | 7/1975 | Endo et al. | 123/487 |
| 4,063,538 | 12/1977 | Powell et al. | 123/425 |
| 4,153,019 | 5/1979 | Laubenstein et al. | 123/425 |
| 4,190,027 | 2/1980 | Inui et al. | 123/425 |

*Primary Examiner*—Charles J. Myhre
*Assistant Examiner*—Andrew M. Dolinar
*Attorney, Agent, or Firm*—Robert J. Sigler

[57] ABSTRACT

In a combustion timing control system of the type wherein peak combustion temperature is sensed and combustion initiation timing is adjusted in closed loop to maintain peak combustion pressure at a desired constant crankshaft rotational angle, the combustion pressure signal is processed in apparatus having differentiating elements with a first time constant, smoothing integrating elements with a second time constant and further elements effective to vary both first and second time constants inversely with crankshaft rotational speed, wherein signal to noise ratio is optimized over the entire range of said speed.

2 Claims, 3 Drawing Figures

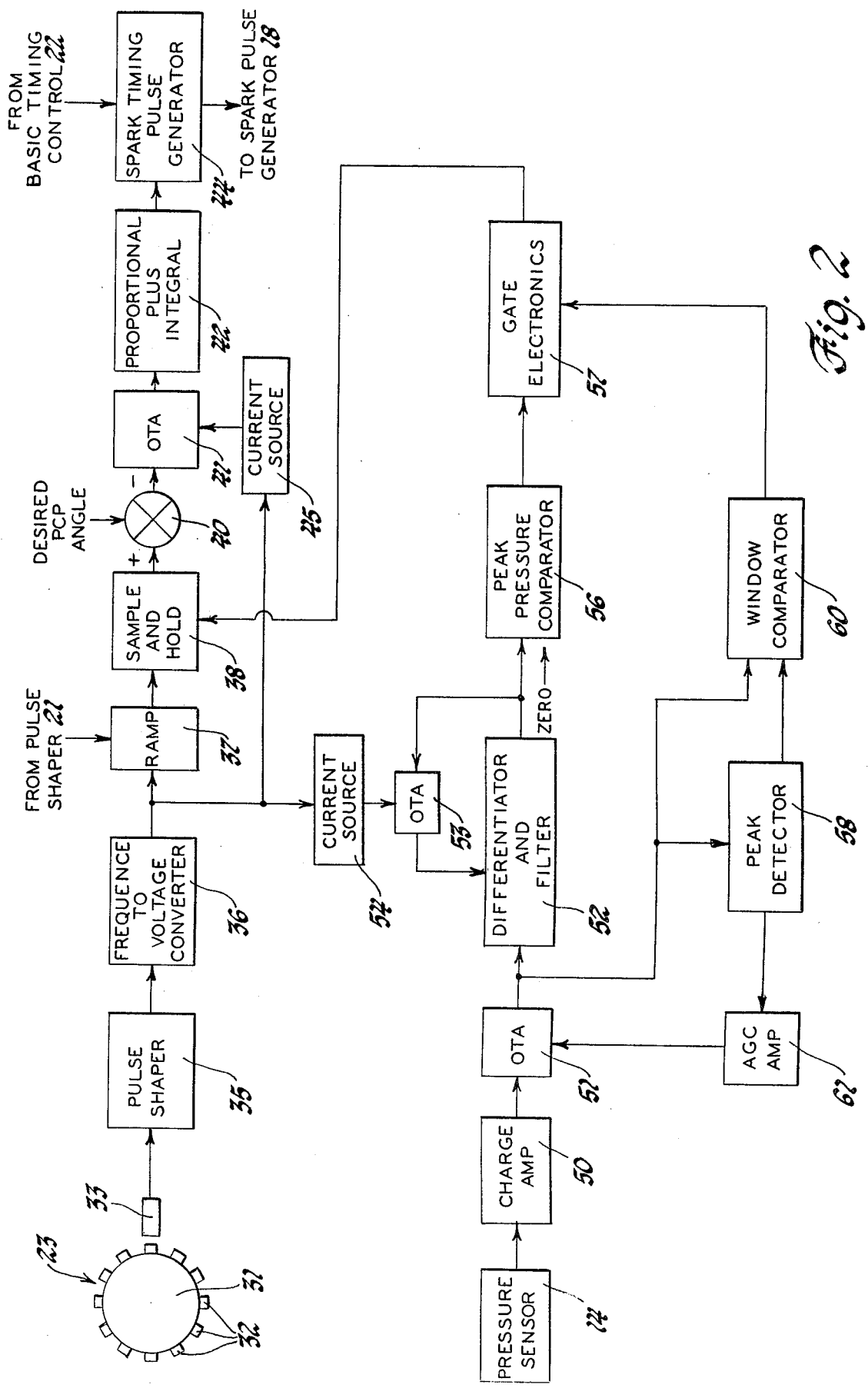

PEAK COMBUSTION PRESSURE CONTROLLED SPARK TIMING CONTROL SYSTEM WITH ENGINE SPEED DEPENDENT FILTER

BACKGROUND OF THE INVENTION

Spark ignited internal combustion engines are provided with spark timing control systems which control the timing of mixture igniting spark events in the engine combustion chambers with variations in engine speed and load. This has generally been accomplished with the aid of mechanically or electronically stored functions of engine spark timing relative to a reference crank angle position as a function of engine speed, load or other factors. Examples of such systems range from the familiar centrifugal and vacuum advance mechanical systems to more recent computerized spark timing control systems utilizing lookup tables or stored function generators.

It has been more recently suggested that optimal control of engine spark timing provides for generation of the spark initiation in each cylinder such that peak combustion pressure occurs at a constant predetermined crankshaft angle relative to the reference crankshaft rotational position. There have been a number of spark timing control systems suggested recently which are based on this control philosophy and which sense the timing of peak combustion pressure in at least one engine combustion chamber, compare it to the desired timing of this event and generate an error signal in a feedback control system to vary engine spark timing so that the error is always tending toward zero.

The accuracy of this method of spark timing control depends in part upon the accuracy with which the peak pressure can be detected. In a normal good combustion event, the pressure within the combustion chamber builds up quickly to a single peak and then falls rapidly again. This pressure rise creates a similar rise in strain on one or more of the engine head bolts, since increased cylinder pressure tends to lift the engine head from the block. Thus a strain sensor associated with a selected head bolt may potentially be used to generate a useful cylinder pressure signal for spark timing, with consequent simplification of equipment and design and cost savings. The resulting signal may be differentiated to determine the precise moment of maximum cylinder pressure. However, the signal is liable to be contaminated with noise at a higher frequency than that of the pressure curve, which noise makes the determination of the precise maximum more difficult. Therefore, it is advisable to provide a smoothing noise filter in a standard manner to the output of the pressure sensor or differentiator so that the precise moment of the maximum can be determined.

However, because the environment of this spark timing control system is an internal combustion engine, the rotational speed of which can vary over a range of approximately 10 to 1 or more, the characteristics of the pressure signal are greatly affected by variations in this engine speed. I have found that both the characteristics of the rising and falling waveform and the characteristics of the imposed background noise vary with engine speed.

SUMMARY OF THE INVENTION

Therefore, it is an object of this invention to provide a closed loop peak combustion pressure timing controlling spark timing control system, the operation of which is optimized over the full range of allowed engine speed.

It is a further object of this invention to provide a spark timing control system as described in the previous object in which signal processing apparatus adapted to process the pressure signal from the engine combustion chamber includes elements having characteristics which are varied with engine speed in the simplest and most efficient manner.

These and other objects are realized in a peak combustion pressure timing controlling spark timing control system in which the output of a combustion pressure sensor is provided to a filter circuit including a differentiator having a first associated time constant and an integrating smoothing filter having a second associated time constant, and in which both the first and second associated time constants are varied inversely with engine speed. In particular, the filter circuit includes an operational amplifier with a differentiating input capacitor $C_1$, an integrating negative feedback capacitor $C_2$ and a negative feedback impedance R to form a transfer function of the form $RC_1s/(1+RC_2s)$. The feedback impedance is embodied in a device which is responsive to an engine speed signal to vary the impedance R inversely therewith so that the time constants of differentiation and integration are both varied inversely with engine speed.

Further details and advantages of this invention will be apparent from the accompanying drawings and following description of a preferred embodiment.

SUMMARY OF THE DRAWINGS

FIG. 2 shows a block diagram in greater detail of the spark control system indicated in FIG. 1.

DESCRIPTION OF THE PREFERRED EMBODIMENT

Figure 1:
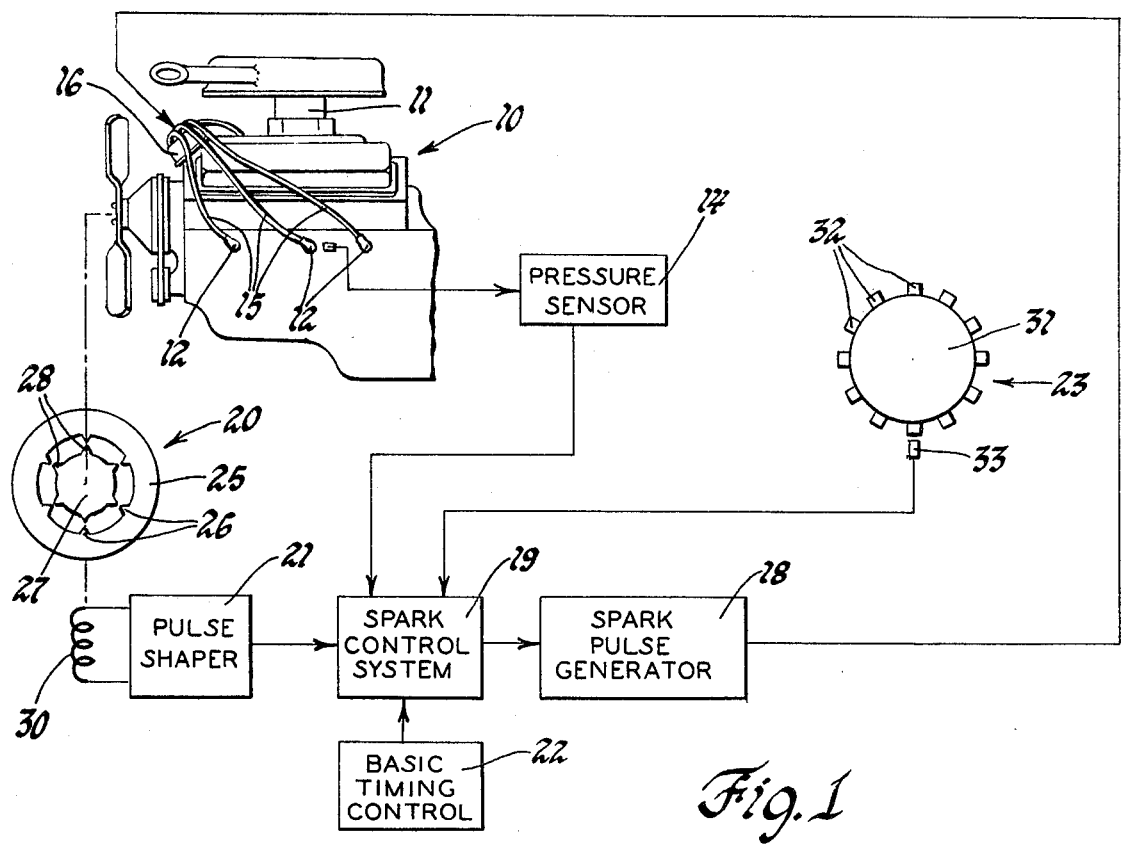
FIG. 1 shows a system block diagram of a spark timing control system according to this invention.

Referring to FIG. 1, an internal combustion engine 10 includes air and fuel induction apparatus 11, which provides a combustible fuel mixture to one or more engine combustion chambers, not shown. A spark plug 12 is provided for each combustion chamber of engine 10 to ignite the combustible mixture when electrically activated with a high voltage pulse. A pressure sensor, indicated at block 14, may be a piezoelectric disk affixed to a recessed surface in the top of an engine headbolt, the head of the bolt being slightly undercut before installation to ensure most of the strain being transmitted through the outer edge of the headbolt head. Pressure sensor 14 is effective to generate an electrical output signal indicative of the internal cylinder pressure of an adjacent cylinder. It should be apparent that a conventional pressure sensor exposed directly to such pressure could also be used if desired.

The high voltage pulses are supplied to spark plugs 12 in the proper sequence through conducting wires 15 from a distributor 16. These high voltage pulses are generated in the usual manner in a spark pulse generator 18 in response to spark timing pulses and provided to distributor 16 for routing to the proper spark plug 12. The spark timing pulses are low voltage pulses which are generated by the spark control system 19 in response to a pulse generator 20, pulse shaper 21, basic timing control 22, pressure sensor 14 and marker pulse generator 23 to mark the precise time for each spark event in a combustion chamber. In a practical system, the spark control system 19, pulse generator 20, pulse shaper 21, basic timing control 22 and spark pulse generator 18 would all be included within the package of the distributor 16 along with the spark distribution apparatus contained therein.

Pulse generator 20 comprises a stator 25 having a plurality of equally spaced projections 26 equal in number to the number of combustion chambers in engine 10. Pulse generator 20 further comprises a rotor 27 having an equal number of projections 28 corresponding to projections 26 in circumferential position. Rotor 27 is adapted to be driven by the crankshaft of engine 10 in synchronization therewith so that the projections 28 of rotor 27 simultaneously pass the projections 26 to stator 25 once for each combustion chamber at a reference crankshaft angle such as top dead center. Stator 25 and rotor 27 are both made of a magnetic material, the reluctance of which changes in a predetermined manner as rotor 27 rotates within stator 25. Pulse shaper 21 includes a coil 30 positioned so as to have an inductance at least partially controlled by the reluctance of the combined pulse generator 20. The voltage across coil 20 is such as to present a sharp change each time the projections 28 pass the projections 26 in the manner described in more detail in the Falgy U.S. Pat. No. 3,254,247. Pulse shaper 21 further includes electronic means to suitably shape the pulses generated across coil 30 for use in the spark timing system in the normal manner.

The shaped pulses from pulse shaper 21 are provided to spark control system 19, in which they are delayed by a predetermined crankshaft angle from the reference pulses in order to achieve the optimum spark timing for engine 10. Spark control system 19 receives the output signal from pressure sensor 14 to use in the closed loop control of peak combustion chamber pressure timing and further receives marker pulses from marker pulse generator 23, which comprises a rotor 31 having a plurality of equally spaced teeth 32 and a stationary magnetic pickup 33 adapted to generate the marker pulses as it is passed by teeth 32 as the rotor is driven in synchronization with the crankshaft of engine 10. Rotor 31 with teeth 32 may be, for example, the engine flywheel with circumferential gear teeth for the starter. The marker pulses from pickup 33 provided an indication to spark control system 19 of the engine crankshaft rotation and also may be used to accurately determine engine crankshaft rotational speed. From this information, as well as that of the pressure sensor 14 and the reference pulses from pulse shaper 21, spark control system 19 generates actual spark timing pulses for spark pulse generator 18, which generates the high voltage pulses to actually fire spark plugs 12 at the predetermined times. Basic timing control 22, in this embodiment, need only comprise an initial predetermined spark timing setting apparatus which may be superseded by the closed loop control after the initiation of engine operation. Examples of spark timing systems containing circuits useful for pulse shaper 21, basic timing control 22 and spark pulse generator 18 are found, among other places, in the U.S. Pat. Nos. to Richards et al 3,838,672 and West 4,106,447.

FIG. 2 shows a more detailed block diagram of spark control system 19. The pulses from magnetic pickup 33 are provided to a pulse shaper 35, in which they are spaced in a predetermined manner and provided to a frequency to voltage converter 36. Frequency to voltage converter 36 is a commercially available device which generates a DC voltage which varies with the frequency of the pulses from pulse shaper 35 and thus with the rotational speed of engine 10. This is only one suitable method of generating an engine speed signal; other equivalent ways will be apparent to those skilled in the art of engine control design.

The speed voltage signal from frequency to voltage converter 36 is provided to a ramp generator 37 to control the ramp rate thereof. Ramp generator 37 is triggered by each pulse from pulse shaper 21 so that its output thereafter is an analog of engine crankshaft position as a function of time from the reference position of the triggering pulse. The rising voltage from ramp generator 37 is provided to a sample and hold circuit 38 which is triggered to sample and hold the output of ramp generator 37 at the precise moment of peak combustion chamber pressure. This voltage represents the actual crankshaft rotational position of the peak combustion chamber pressure. It may, therefore, be compared in a summing junction 40, in which it is combined with the desired crankshaft angle of peak combustion pressure to generate an error signal for use in controlling spark timing.

The error signal from summing junction 40 is provided through an operational transconductance amplifier (OTA) 41 to a proportional plus integral feedback control circuit 42 of standard design to vary the timing of sprak timing pulses in a spark timing pulse generator from a constant predetermined timing provided by basic timing control 22. The variation is such in direction and angle to reduce the error signal of future generated pulses toward zero. The output of spark timing pulse generator 44 is provided to spark pulse generator 18 to actually generate the spark pulse in the combustion chamber. Other arrangements of the closed loop control will occur to those skilled in the art and may be substituted for that described above.

Operational transconductance amplifier (OTA) 41 is a variable gain device comprising an operational amplifier the actual gain of which is controlled by a current source 45. In this embodiment, current source 45 is a variable current source the current output of which is controlled by the output of frequency to voltage converter 36. Thus, OTA 41 has a gain which varies proportionally with engine speed. Thus, the error signal applied to proportional plus integral controller 42 is proportional to engine speed. This is desirable so that the proportional gain and integration rate track the frequency with which spark events occur.

Pressure sensor 14 provides an output signal to a charge amp 50 which provides an output voltage proportional to pressure within the combustion chamber to an OTA 51. OTA 51 is an AGC element, the operation of which will be described in more detail below.

The output of OTA 51 is provided to a differentiator and filter circuit 52 having a feedback loop containing an OTA 53 controlled by a current source 54 of variable current determined by frequency to voltage converter 36. The output of differentiator and filter circuit 52 is provided to a peak pressure comparator 56 which also has a reference input of zero to detect the derivative zero crossover and therefore the maximum point of the pressure within the combustion chamber. The output of peak pressure comparator 56 signals gate electronics 57 which, if activated, activates sample and hold circuit 38.

Returning to the output of OTA 51, this output is also provided to an averaging peak detector 58 and a window comparator 60. The output of peak detector 58 is provided to an AGC amp 61, the output of which controls the gain of OTA 51 in an AGC loop. This AGC loop is intended to compensate for the varying gains and output levels of different pressure sensors and might not be necessary in a production version with sufficiently strict control over such output levels. The outut of peak detector 58, reduced in amplitude by 50 percent, is also provided to window comparator 60 in order to provide an activating window for sample and hold circuit 38 by way of gate electronics 57, whenever the sensed combustion pressure exceeds 50 percent of the previous maximum peak combustion pressure. An additional, optional, window comparator may be included which controls gate electronics 57 to allow actuation of sample and hold circuit 38 in each ramp only between approximately 5 and 35 degrees after top dead center to ignore false peak generating phenomena at top dead center such as piston slap and monitoring pressure peak, which latter may be greater at light loads then the combustion pressure peak. Rather than beginning at a constant 5 degrees after top dead center, this window may vary its beginning with one half the average peak pressure. Gate electronics 57 may comprise an AND gate.

Figure 3:
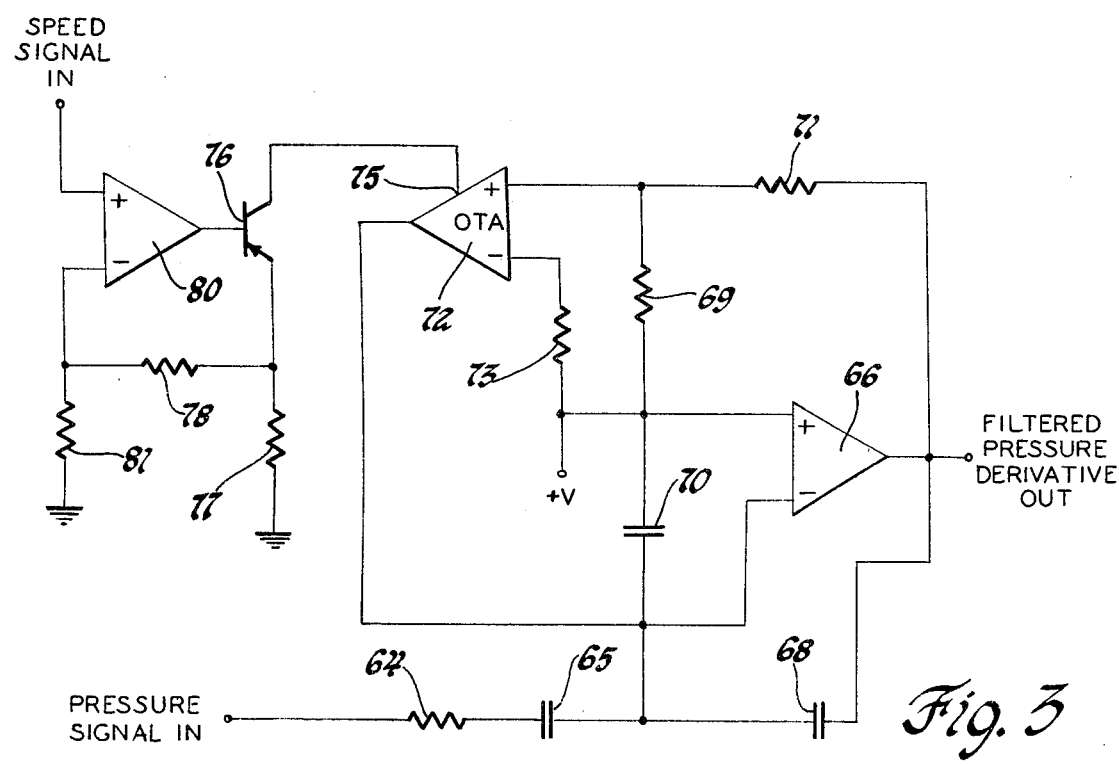
FIG. 3 shows a circuit diagram of the differentiator and filter indicated in the system of FIG. 2.

FIG. 3 shows a detailed circuit configuration of a preferred embodiment for differentiator and filter 52, OTA 53 and current source 54. Referring to FIG. 3, the cylinder pressure signal from OTA 51 is provided through a resistor 64 and capacitor 65 ($C_1$) to the inverting input of an operational amplifier (op amp) 66. The output of operational amplifier 66 is connected to the inverting input through a capacitor 68 ($C_2$) and to the noninverting input thereof through a resistor 71 and resistor 69 in series. The inverting and noninverting inputs of operational amplifier 66 are connected by a capacitor 70.

The output of operational amplifier 66 is further connected through resistor 71 to the noninverting input of an operational transconductance amplifier (OTA) 72, having an inverting input connected through a resistor 73 to a voltage source at +V, which is also connected to the noninverting input of operational amplifier 66. The output of OTA 72 is connected to the inverting input of op amp 66. OTA is provided with a gain control input 75, which is connected to the collector of a PNP bipolar transistor 76 having an emitter connected through a resistor 77 to ground and further through a resistor 78 to the inverting input of an op amp 80. The inverting input of op amp 80 is further connected through a resistor 81 to ground; and op amp 80 has a noninverting input provided with the speed voltage signal from frequency to voltage converter 36.

It can be seen that op amp 80, transistor 76 and the associated resistors 77, 78 and 81 comprise a current source which generates an output current at the collector of transistor 76 which is controlled by the input voltage at the non-inverting input from the speed voltage signal generated by frequency to voltage converter 36. This current is provided to the gain control input 75 of OTA 72 to control the transconductance thereof. OTA 72 is thus essentially a variable resistor in a negative feedback loop of op amp 66 along with capacitor 68 in parallel therewith to comprise an integrating circuit. The time constant controlled by the value of capacitor 68 and the resistance of OTA 72 is set, with relation to the characteristics of the pressure signal which is input to the inverting input of op amp 66, so as to provide a smoothing filter for the pressure signal and thus make it easier to determine the maximum thereof.

The input capacitor 65 to the inverting input of op amp 66, together with the equivalent feedback resistance of OTA 72 comprises a differentiating circuit; and the value of capacitor 65 is determined so as to effectively generate at the output of op amp 66 the time derivative of the pressure signal which is input through capacitor 65. It is thus apparent that the equivalent resistance of OTA 72, which is variably controlled in response to the engine speed signal generated in frequency to voltage converter 36, affects the time constant of integration and differentiation of the circuit. The transfer function of the circuit takes the form $RC_1s/(1 + RC_2s)$, where R is the equivalent resistance of OTA 71, $C_1$ is the capacitance of capacitor 65 and $C_2$ is the capacitance of capacitor 68. The resistance R of OTA 72 is thus seen to enter the expressions for both time constants; and the circuit thus efficiently varies both time constants in the desired manner with engine speed simultaneously.

In the preceding description of a preferred embodiment, all items represented by blocks are either commercially available as described, well known to those skilled in the art or easily designed by the same from the cited references. With respect to the circuit of FIG. 3, sample component values or identifications follow:

OTA 72—CA3080
op amps:
    66—2902
    80—CA3140
resistors:
    64—15 K
    69, 73—1 K
    71—249 K
    77—120 K
    78, 81—2000 MEG
capacitors:
    65—680 pf
    68—220 pf
    70—390 pf
transistor 76—2N4403

The preceding is a preferred embodiment of this invention; but other embodiments will occur to those skilled in the art. Therefore, the invention should be limited only by the claims which follow.

The embodiments of the invention in which an exclusive property or privilege is claimed are defined as follows:

1. A combustion control system for an internal combustion engine having a rotating crankshaft, said system being of the type in which the occurrence, relative to crankshaft rotational position, of peak combustion pressure is sensed and a combustion controlling parameter adjusted in response thereto, the system comprising, in combination:
means effective to sense combustion pressure and generate a signal in response thereto, said signal being subject to engine generated noise;
means effective to sense the rotation of the crankshaft and generate a signal indicative of the rotational speed thereof;
signal processing apparatus effective to derive a smoothed time derivative of the combustion pressure signal, said apparatus including time derivative elements with an associated first time constant, noise reducing time integrating elements with an associated second time constant and additional elements responsive to the crankshaft speed signal to vary both the first and second time constants inversely with crankshaft rotational speed, whereby signal to noise ratio is optimized; and means effective to sense the zero crossing of the smoothed time derivative of the combustion pressure signal to identify the occurrence of peak combustion pressure.

2. A combustion control system for an internal combustion engine having a rotating crankshaft, said system being of the type in which the occurrence, relative to crankshaft rotational position, of peak combustion pressure is sensed and a combustion controlling parameter adjusted in response thereto, the system comprising, in combination:

means effective to sense combustion pressure and generate a signal in response thereto, said signal being subject to engine generated noise;

means effective to sense the rotation of the crankshaft and generate a signal indicative of the rotational speed thereof;

signal processing apparatus effective to derive a smoothed time derivative of the combustion pressure signal, said apparatus including an operational amplifier having a differentiating input capacitor $C_1$, an integrating negative feedback capacitor $C_2$, and a negative feedback resistance device having a variable resistance R, said apparatus thereby having a transfer function of the form $RC_1s/(1+RC_2s)$ and further having circuit means responsive to the rotational speed signal to vary the variable resistance R inversely therewith, whereby signal to noise ratio is optimized; and means effective to sense the zero crossing of the smoothed time derivative of the combustion pressure signal to identify the occurrence of peak combustion pressure.

* * * * *